(12) United States Patent
Zhou

(10) Patent No.: US 10,713,467 B2
(45) Date of Patent: Jul. 14, 2020

(54) OPTICAL FINGERPRINT VERIFICATION METHOD AND MOBILE TERMINAL

(71) Applicant: GUANGDONG OPPO MOBILE TELECOMMUNICATIONS CORP., LTD., Dongguan, Guangdong (CN)

(72) Inventor: Yibao Zhou, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 254 days.

(21) Appl. No.: 15/957,408

(22) Filed: Apr. 19, 2018

(65) Prior Publication Data

US 2018/0322322 A1    Nov. 8, 2018

(30) Foreign Application Priority Data

May 3, 2017    (CN) .......................... 2017 1 0305873

(51) Int. Cl.
*G06K 9/00*        (2006.01)

(52) U.S. Cl.
CPC ......... *G06K 9/001* (2013.01); *G06K 9/00013* (2013.01)

(58) Field of Classification Search
CPC .......... G06K 9/00046; H01L 27/14601; H01L 27/14625; H01L 27/14629; H01L 27/14678
USPC ....................................................... 382/125
See application file for complete search history.

(56) References Cited

U.S. PATENT DOCUMENTS

| 9,893,102 | B2* | 2/2018 | Raguin ............ H01L 27/14601 |
| 2002/0131624 | A1 | 9/2002 | Shapiro |
| 2016/0147987 | A1 | 5/2016 | Jang et al. |
| 2016/0321496 | A1 | 11/2016 | Mather et al. |
| 2017/0076133 | A1 | 3/2017 | Hillmann et al. |
| 2017/0103252 | A1 | 4/2017 | Li et al. |
| 2017/0193210 | A1 | 7/2017 | Liu et al. |

FOREIGN PATENT DOCUMENTS

| CN | 102034095 | 4/2011 |
| CN | 102339382 | 2/2012 |
| CN | 103400108 | 11/2013 |

(Continued)

OTHER PUBLICATIONS

SIPO, Second Office Action for CN Application No. 201710305873.7, dated Jul. 19, 2019.

(Continued)

*Primary Examiner* — Charlotte M Baker
(74) *Attorney, Agent, or Firm* — Hodgson Russ LLP

(57) ABSTRACT

Embodiments of the present disclosure provide an optical fingerprint verification method and a mobile terminal. The method may include: controlling the optical sensor to detect an external ambient light intensity when the mobile terminal acquires a fingerprint collecting instruction; controlling the optical fingerprint identification component to collect fingerprint data; and determining whether the fingerprint data matches to a set of target fingerprint template data corresponding to the external ambient light intensity via the AP, and when the fingerprint data matches to the set of target fingerprint template data, determining that a fingerprint verification is passed.

20 Claims, 9 Drawing Sheets

(56) References Cited

FOREIGN PATENT DOCUMENTS

| | | |
|---|---|---|
| CN | 103761463 | 4/2014 |
| CN | 104239465 | 12/2014 |
| CN | 104463083 | 3/2015 |
| CN | 104537365 | 4/2015 |
| CN | 104598899 | 5/2015 |
| CN | 105045495 | 11/2015 |
| CN | 105184284 | 12/2015 |
| CN | 105302596 | 2/2016 |
| CN | 105468153 | 4/2016 |
| CN | 105653922 | 6/2016 |
| CN | 205281501 | 6/2016 |
| CN | 105809141 | 7/2016 |
| CN | 106095295 | 11/2016 |
| CN | 106233306 | 12/2016 |
| CN | 106453723 | 2/2017 |
| CN | 106488022 | 3/2017 |
| CN | 107153818 | 9/2017 |
| EP | 1318473 | 6/2003 |
| TW | 201612724 | 4/2016 |

OTHER PUBLICATIONS

SIPO, First Office Action for CN Application No. 201710305873, dated May 29, 2019.
EPO, Office Action for EP Application No. 18169802, dated Sep. 18, 2018.
WIPO, English translation of the ISR/WO for PCT/CN2018/084485, dated Aug. 1, 2018.
IPOS, Office Action for SG Application No. 11201906529P, dated Feb. 18, 2020.

* cited by examiner

OPTICAL FINGERPRINT VERIFICATION METHOD AND MOBILE TERMINAL

CROSS-REFERENCE TO RELATED APPLICATIONS

This application is based on and claims priority of Chinese Patent Application No. 201710305873.7, filed on May 3, 2017, the entire contents of which are incorporated herein by reference.

TECHNICAL FIELD

The present disclosure relates to a field of mobile terminals, and more particularly relates to an optical fingerprint verification method and a mobile terminal.

BACKGROUND

With widespread use of mobile terminals such as smart phones, almost everyone in modern life owns a mobile phone. At present, mobile phones generally use fingerprint identification technology which may be applied to various aspects such as unlocking a mobile terminal, mobile payment and the like.

Optical fingerprint identification technology is widely applied to various fingerprint identification components of mobile terminals due to advantages such as good stability and high identifying sensitivity. Generally, an optical fingerprint identification component includes a light source and an optical fingerprint detecting component. An image-forming principle for the optical fingerprint identification may be described as follows. The light source emits a light, the light passes through a displaying screen surface pressed with a fingerprint and then may be reflected to the optical fingerprint identification component, the optical fingerprint identification component receives the reflected light and converts the light into fingerprint data for processing, such that a fingerprint image is formed. A principle of fingerprint matching refers to that the optical fingerprint identification component matches the formed fingerprint image to a pre-stored fingerprint image, so as to acquire a matching result.

However, the reflected light received by the optical fingerprint identification component may be easily affected by external ambient light, leading to a deviation of the collected fingerprint data, thereby affecting the fingerprint matching result.

SUMMARY

Embodiments of the present disclosure provide an optical fingerprint verification method and a mobile terminal.

Embodiments of the present disclosure provide an optical fingerprint verification method. The method is applied to a mobile terminal including an application processor (AP), an optical sensor, and an optical fingerprint identification component. The method may include: controlling, by the mobile terminal, the optical sensor to detect an external ambient light intensity when the mobile terminal acquires a fingerprint collecting instruction; controlling, by the mobile terminal, the optical fingerprint identification component to collect fingerprint data; and determining, by the mobile terminal, whether the fingerprint data matches to a set of target fingerprint template data corresponding to the external ambient light intensity via the AP, and when the fingerprint data matches to the set of target fingerprint template data, determining by the mobile terminal that a fingerprint verification is passed.

Embodiments of the present disclosure provide a mobile terminal, including an AP, an optical sensor, and an optical fingerprint identification component. The optical sensor is configured to detect an external ambient light intensity when the mobile terminal acquires a fingerprint collecting instruction. The optical fingerprint identification component is configured to collect fingerprint data. The AP is configured to determine whether the fingerprint data matches to a set of target fingerprint template data corresponding to the external ambient light intensity, and to determine that a fingerprint verification is passed when the fingerprint data matches to the set of target fingerprint template data.

Embodiments of the present disclosure provide a mobile terminal including an AP, an optical sensor, and an optical fingerprint identification component, a memory and one or more programs, in which the optical fingerprint identification component. The one or more programs are stored in the memory and configured to be executed by the AP. The one or more programs include instructions for performing acts of: controlling the optical sensor to detect an external ambient light intensity when a fingerprint collecting instruction is acquired; controlling the optical fingerprint identification component to collect fingerprint data; and determining whether the fingerprint data matches to a set of target fingerprint template data corresponding to the external ambient light intensity via the AP, and when the fingerprint data matches to the set of target fingerprint template data, determining that a fingerprint verification is passed.

Embodiments of the present disclosure provide an optical fingerprint verification apparatus. The apparatus is applied to a mobile terminal including an AP, an optical sensor, and an optical fingerprint identification component. The apparatus may include: a detecting unit, a collecting unit, a judging unit and a determining unit. The detecting unit is configured to control the optical sensor to detect an external ambient light intensity when the mobile terminal acquires a fingerprint collecting instruction. The collecting unit is configured to control the optical fingerprint identification component to collect fingerprint data. The judging unit is configured to determine whether the fingerprint data matches to a set of target fingerprint template data corresponding to the external ambient light intensity via the AP. The determining unit is configured to determine that a fingerprint verification is passed when the judging unit determines that the fingerprint data matches to the set of target fingerprint template data.

Embodiments of the present disclosure provide a computer readable storage medium having computer programs for exchanging digital data stored thereon, in which the computer programs are configured to cause a computer to perform all or a part of acts of the method according to the first aspect of embodiments of the present disclosure.

Embodiments of the present disclosure provide a computer program product including a non-transitory computer-readable storage medium storing computer programs, in which the computer programs are executed to cause a computer to perform all or a part of acts of the method according to the first aspect of embodiments of the present disclosure.

BRIEF DESCRIPTION OF THE DRAWINGS

In order to make the technical solutions of embodiments of the present invention more clearly, the accompanying drawings used in the description of embodiments of the present invention are briefly described herein. Obviously, the described drawings are merely some embodiments of present invention. For persons skilled in the art, other drawings may be obtained based on these drawings without any creative work.

DETAILED DESCRIPTION

The technical solutions in embodiments of the present invention are hereinafter described clearly and completely with reference to accompanying drawings in embodiments of the present invention. Apparently, embodiments described are a part of embodiments of the present invention, but not all embodiments. All other embodiments obtained by those skilled in the art based on the embodiments in the present invention without creative labor shall fall in the protection scope of the present invention.

Terms such as "first", "second" and the like used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred in the present disclosure means that, particular features, structures and characteristics described in combination with embodiments may be covered in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that, embodiments described herein can be combined with other embodiments.

The mobile terminal described in embodiments of the present disclosure may include various devices having a wireless communication functions, such as a portable device, a vehicle-mounted device, a wearable device, a computing device or other processing device connected to a wireless modem, various forms of user equipments (UEs), mobile stations (MSs), terminal devices and the like. For ease of description, the above-mentioned devices are collectively referred to as mobile terminals.

Embodiments of the present disclosure will be described in detail hereinafter.

Figure 1A:
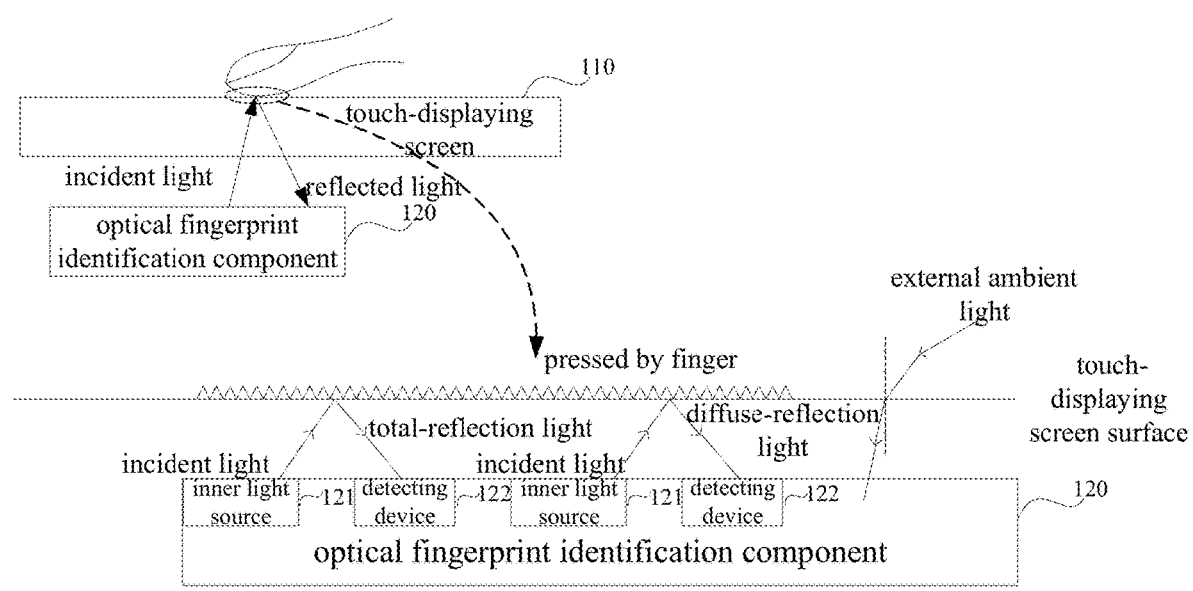
FIG. 1a is a schematic diagram illustrating an operating principle of an optical fingerprint identification component according to an embodiment of the present disclosure.

In order to have a better understanding of the embodiments of the present disclosure, an operating principle of an optical fingerprint identification component provided by embodiments of the present disclosure is described in detail firstly. Referring to FIG. 1a, FIG. 1a is a schematic diagram illustrating an operating principle of an optical fingerprint identification component according to an embodiment of the present disclosure. As illustrated in FIG. 1a, a touch-displaying screen 110 and an optical fingerprint identification component 120 are included. The optical fingerprint identification component 120 includes an inner light source 121 and a detecting device 122. The detecting device 122 may be a charge couple device (CDD) array. The optical fingerprint identification component 120 may include at least one inner light source 121 and at least one detecting device 122. The inner light source 121 may emit incident light. The incident light may pass through a touch-displaying screen surface and may be reflected at a region in contact with a finger. The reflected light is received by the detecting device 122 and converted to electric signal data. The optical fingerprint identification component 120 may identify the incident light in contact with bulge portions of the fingerprint (ridges of the fingerprint) and the incident light in contact with sunken portions of the fingerprint (valleys of the fingerprint) according to a total reflection principle.

Referring to an enlarged area indicated by the dotted line in FIG. 1a, for the touch-displaying screen surface, the ridges of the fingerprint are in contact with the touch-displaying screen surface, while the valleys of the fingerprint are not contact with the touch-displaying screen surface. When the incident light generated by the optical fingerprint identification component 120 is emitted on the valleys of the fingerprint, the incident light is emitted on a surface of the touch-displaying screen in contact with air. In this case, by designing an incident angle of the incident light, the incident light can be totally reflected (a refractive index of material of the touch-displaying screen is greater than 1, a refractive index of air is approximately equal to 1, i.e., it is required to set the refractive index of the material of the touch-displaying screen greater than the refractive index of air). Thus, the optical fingerprint identification component 120 may receive total-reflection light with a high intensity. When the incident light generated by the optical fingerprint identification component 120 is emitted on the ridges of the fingerprint, the incident light is emitted on a surface of the touch-displaying screen in contact with the bulge portions of the fingerprint. In this case, the incident light is emitted on the bulge portions of the finger and a diffuse reflection occurs. Thus, the optical fingerprint identification component 120 may receive diffuse-reflection light with a low intensity. The optical fingerprint identification component 120 may form an fingerprint image according to the intensity of the received light. As the refractive index of the material of the touch-displaying screen is greater than the refractive index of air, external ambient light may easily pass through the touch-displaying screen and enter the optical fingerprint identification component, casing interference to the reflected light received by the optical fingerprint identification component.

Figure 1B:
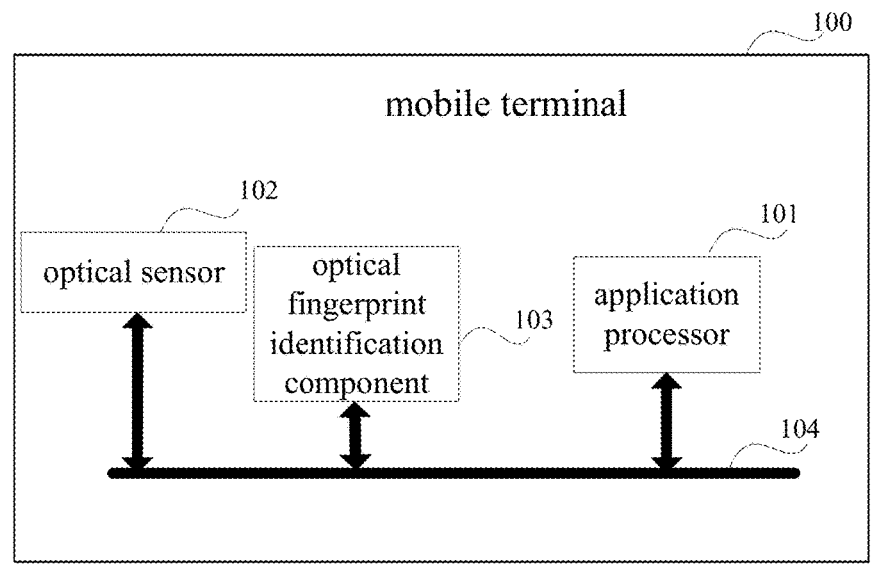
FIG. 1b is a structure diagram of a mobile terminal according to an embodiment of the present disclosure.

Referring to FIG. 1b, FIG. 1b is a structure diagram of a mobile terminal according to an embodiment of the present disclosure. As illustrated in FIG. 1b, the mobile terminal 100 includes an application processor (AP) 101, an optical sensor 102, and an optical fingerprint identification component 103 including an inner light source 1031 (not illustrated in FIG. 1b). The AP 101 is coupled to the optical sensor 102 and the optical fingerprint identification component 103 via a bus 104.

The optical sensor 102 is configured to detect a current external ambient light intensity when the mobile terminal receives a fingerprint collecting instruction, and to send the current external ambient light intensity to the AP 101.

The fingerprint collecting instruction may be inputted by a user or may be generated by the touch-displaying screen due to user touch, and the touch-displaying screen may send the fingerprint collecting instruction to the AP 101 of the mobile terminal. When the mobile terminal receives the fingerprint collecting instruction, the optical sensor 102 detects the current external ambient light intensity, and sends the current external ambient light intensity to the AP 101. The optical sensor 102 may detect a total intensity of the external ambient light. In an embodiment, the optical sensor 102 may detect from the external ambient light ambient light having a wave length equal to that of the light emitted by the inner light source 1031.

The AP 101 is configured to acquire a set of target fingerprint template data corresponding to a target external ambient light intensity range according to a correspondence between a plurality of external ambient light intensity ranges and sets of fingerprint template data, after the AP determines that the current external ambient light intensity falls in the target external ambient light intensity range.

The optical fingerprint identification component 103 is configured to control the inner light source 1031 to collect fingerprint data.

The inner light source 1031 of optical fingerprint identification component 103 may collect the fingerprint data by emitting lights.

The AP 101 is further configured to determine whether the fingerprint data matches to the set of target fingerprint template data.

The AP 101 is further configured to determine that a fingerprint verification is passed when the fingerprint data matches to the set of target fingerprint template data.

The correspondence between the plurality of external ambient light intensity ranges and the sets of fingerprint template data may be pre-stored in a memory (such as a non-transitory memory) of the mobile terminal. Different external ambient light intensity ranges may correspond respectively to different sets of fingerprint template data. For example, the external ambient light intensity range may be 1-50, which corresponds to a first set of fingerprint template data in the sets of fingerprint template data; the external ambient light intensity range may be 51-100, which corresponds to a second set of fingerprint template data in the sets of fingerprint template data; the external ambient light intensity range may be 101-150, which corresponds to a third set of fingerprint template data in the sets of fingerprint template data; the external ambient light intensity range may be 151-200, which corresponds to a fourth set of fingerprint template data in the sets of fingerprint template data. The first set of fingerprint template data may be collected by the optical fingerprint identification component 103 when the external ambient light intensity falls in the range of 1-50, the second set of fingerprint template data may be collected by the optical fingerprint identification component 103 when the external ambient light intensity falls in the range of 51-100, the third set of fingerprint template data may be collected by the optical fingerprint identification component 103 when the external ambient light intensity falls in the range of 101-150, and the fourth set of fingerprint template data may be collected by the optical fingerprint identification component 103 when the external ambient light intensity falls in the range of 151-200. When the current external ambient light intensity is 75, the AP 101 may use the second set of fingerprint template data to match the collected fingerprint data. It should be noted that the above-mentioned values of the light intensity are acquired according to the same standard normalization processing.

Based on different external ambient light intensities, the fingerprint data collected by the optical fingerprint identification component 103 may be different. The fingerprint data collected by the optical fingerprint identification component 103 may be affected by the external ambient light. If the same set of fingerprint template data is used to performing the matching based on different external ambient light intensities, it is easy to cause a failure of the matching. In embodiments of the present disclosure, a plurality of sets of fingerprint template data may be collected in advance, and the set of fingerprint template data having highest matching degree is selected to perform the matching based on different external ambient light intensities, thus the success rate of the optical fingerprint matching may be improved.

In an embodiment, the optical fingerprint identification component 103 is further configured to control the inner light source 1031 to collect the set of fingerprint template data based on at least two external ambient light intensities so as to acquire at least two sets of fingerprint template data before the AP 101 acquires the set of target fingerprint template data corresponding to the target external ambient light intensity range according to the correspondence between the plurality of external ambient light intensity ranges and the sets of fingerprint template data.

The AP 101 is further configured to establish the correspondence between the plurality of external ambient light intensity ranges and the sets of fingerprint template data according to the at least two sets of fingerprint template data.

In embodiments of the present disclosure, the optical fingerprint identification component 103 may collect the set of fingerprint template data based on at least two external ambient light intensities respectively, so as to acquire the at least two sets of fingerprint template data. For example, the optical fingerprint identification component 103 may collect the first set of fingerprint template data when the external ambient light intensity is 25, collect the second set of fingerprint template data when the external ambient light intensity is 75, collect the third set of fingerprint template data when the external ambient light intensity is 125, and collect the fourth set of fingerprint template data when the external ambient light intensity is 175. The AP 101 may establish the correspondence between the plurality of external ambient light intensity ranges and the sets of fingerprint template data according to the first set of fingerprint template data, the second set of fingerprint template data, the third set of fingerprint template data and the fourth set of fingerprint template data. For example, the correspondence between the plurality of external ambient light intensity ranges and the sets of fingerprint template data may be described as follows. The external ambient light intensity range of 1-50 corresponds to the first set of fingerprint template data in the sets of fingerprint template data, the external ambient light intensity range of 51-100 corresponds to the second set of fingerprint template data in the sets of fingerprint template data, the external ambient light intensity range of 101-150 corresponds to the third set of fingerprint template data in the sets of fingerprint template data, and the external ambient light intensity range of 151-200 corresponds to the fourth set of fingerprint template data in the sets of fingerprint template data.

In an embodiment, the optical fingerprint identification component 103 may control the inner light source to respectively collect the set of fingerprint template data based on at least two external ambient light intensities so as to acquire the at least two sets of fingerprint template data as follows.

The optical fingerprint identification component 103 may control the inner light source to collect at least four sets of original fingerprint data based on at least two external ambient light intensities with at least two light intensities of the inner light source.

The optical fingerprint identification component 103 or the AP 101 may select a set of original fingerprint data with a minimum noise from at least two sets of original fingerprint data collected based on a first external ambient light intensity and determine the set of original fingerprint data with the minimum noise as the set of fingerprint template data corresponding to the first external ambient light intensity. The first external ambient light intensity is selected from the at least two external ambient light intensities.

In embodiments of the present disclosure, for example, the optical fingerprint identification component 103 controls the inner light source to collect first set of original fingerprint data based on a first light intensity of the light source (for example, the first light intensity of the light source is 50) when the first external ambient light intensity is 25, controls the inner light source to collect second set of original fingerprint data based on a second light intensity of the light source (for example, the second light intensity of the light source is 200) when the first external ambient light intensity is 25, and compares the noise of the first set of original fingerprint data and the noise of the second set of original fingerprint data. If the noise of the second set of original fingerprint data is smaller than the noise of the first set of original fingerprint data, the second set of original fingerprint data may be regarded as the set of fingerprint template data corresponding to the first external ambient light intensity equal to 25. In embodiments of the present disclosure, the optical fingerprint identification component 103 may control the inner light source to emit lights with different intensities. Based on the same external ambient light intensity, the inner light source may collect fingerprints by using different light intensities to acquire fingerprint data with different noises. In a case of the first external ambient light intensity, if the fingerprint data acquired by the inner light source with the first light intensity has the minimum noise, the fingerprint data acquired by the inner light source with the first light intensity may be regarded as the first set of fingerprint template data corresponding to the first external ambient light intensity. When the fingerprint matching is performed, if the external ambient light intensity is the first external ambient light intensity, the optical fingerprint identification component 103 may control the inner light source to collect the fingerprint data with the first light intensity and match the collected fingerprint data with the first set of fingerprint template data corresponding to the first external ambient light intensity. In embodiments of the present disclosure, the success rate of fingerprint matching may be further improved by using the set of fingerprint template data with a small noise.

In an embodiment, the AP 101 is further configured to determine whether the current external ambient light intensity is smaller than a preset intensity.

The AP 101 is further configured to detect whether a current time is within a preset nighttime period when the current external ambient light intensity is smaller than the preset intensity.

The optical fingerprint identification component 103 is further configured to control the inner light source to collect the fingerprint data when the current time is within the preset nighttime period.

The preset intensity may be pre-set and stored in a non-transitory memory of the mobile terminal. The preset intensity may be set as intensity at nightfall. Generally, when the current external ambient light intensity is smaller than the preset intensity, it may be determined that the current external ambient light intensity is low. The AP 101 may further determine whether the current time is within the preset nighttime period. The preset nighttime period mentioned herein may be a time period from 19:00 to 6:00. When the current time is within the preset nighttime period, it means that the external ambient light intensity is low, and when the external ambient light intensity is detected as low, it may be determined that the currently detected external ambient light intensity is accurate, and the optical fingerprint identification component 103 may control the inner light source to collect the fingerprint data. By implementing embodiments of the present disclosure, it may be determined whether the currently detected external ambient light intensity is accurate in combination with the current external ambient light intensity and the current time, thus the success rate of the fingerprint matching may be further improved.

Figure 1C:
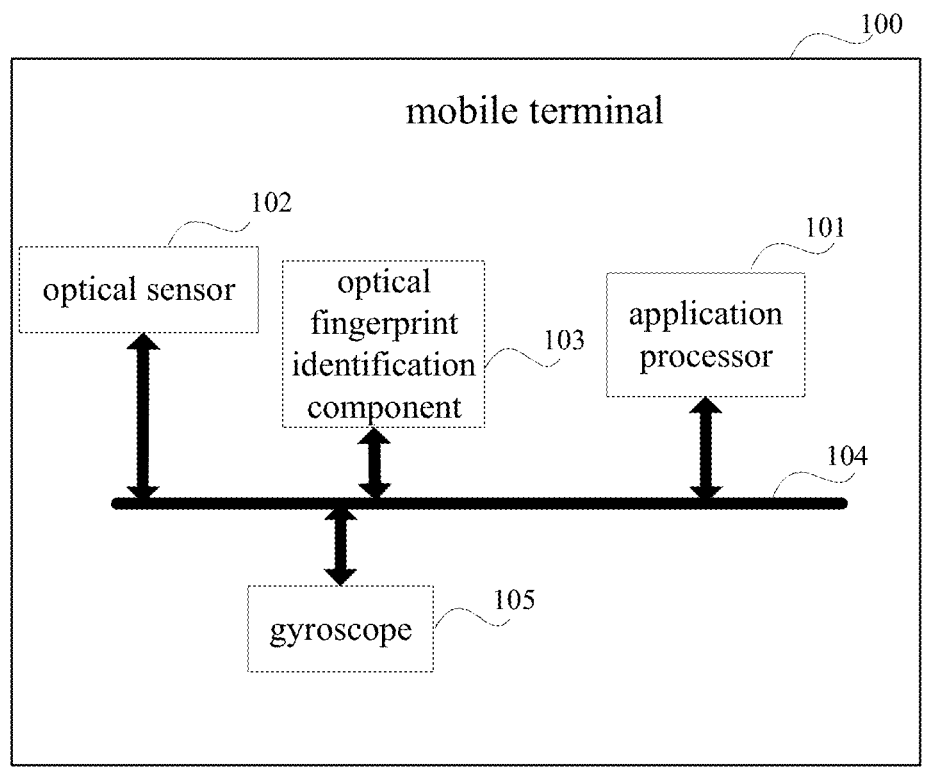
FIG. 1c is a structure diagram of a mobile terminal according to another embodiment of the present disclosure.

In an embodiment, as illustrated in FIG. 1c, the mobile terminal further includes a gyroscope 105.

The gyroscope 105 is configured to measure an angular velocity of the mobile terminal when the current time is beyond the preset nighttime period.

The AP 101 is further configured to control the inner light source of the optical fingerprint identification component 103 not to collect the fingerprint data when the gyroscope 105 detects that the angular velocity of the mobile terminal is greater than a preset angular velocity.

The optical fingerprint identification component 103 is further configured to control the inner light source of the optical fingerprint identification component 103 not to collect the fingerprint data when the gyroscope 105 detects that the angular velocity of the mobile terminal is greater than the preset angular velocity.

When the current time is beyond the preset nighttime period, it means that the currently measured external ambient light intensity is not in conformity with the current time. It is determined whether the mobile terminal is in a moving state by measuring the angular velocity of the mobile terminal with the gyroscope 105. If the current time is daytime, the mobile terminal is in the moving state and the current external ambient light intensity is low, it may be determined that the mobile terminal is in a pocket or a bag of the user. The fingerprint collecting instruction received by the mobile terminal is caused by a spurious triggering. Thus, the AP 101 refuses to execute the fingerprint collecting instruction. By implementing embodiments of the present disclosure, when the currently measured external ambient light intensity is not in conformity with the current time, it is determined whether the fingerprint collecting instruction received by the mobile terminal is caused by a spurious triggering, and when it is determined that the fingerprint collecting instruction received by the mobile terminal is caused by a spurious triggering, the fingerprint collecting instruction is not executed. Therefore, fingerprint collection caused by the spurious triggering may be avoided without triggering the inner light source of the optical fingerprint identification component 103 to work, thereby reducing power consumption of the optical fingerprint identification component 103.

Figure 1D:
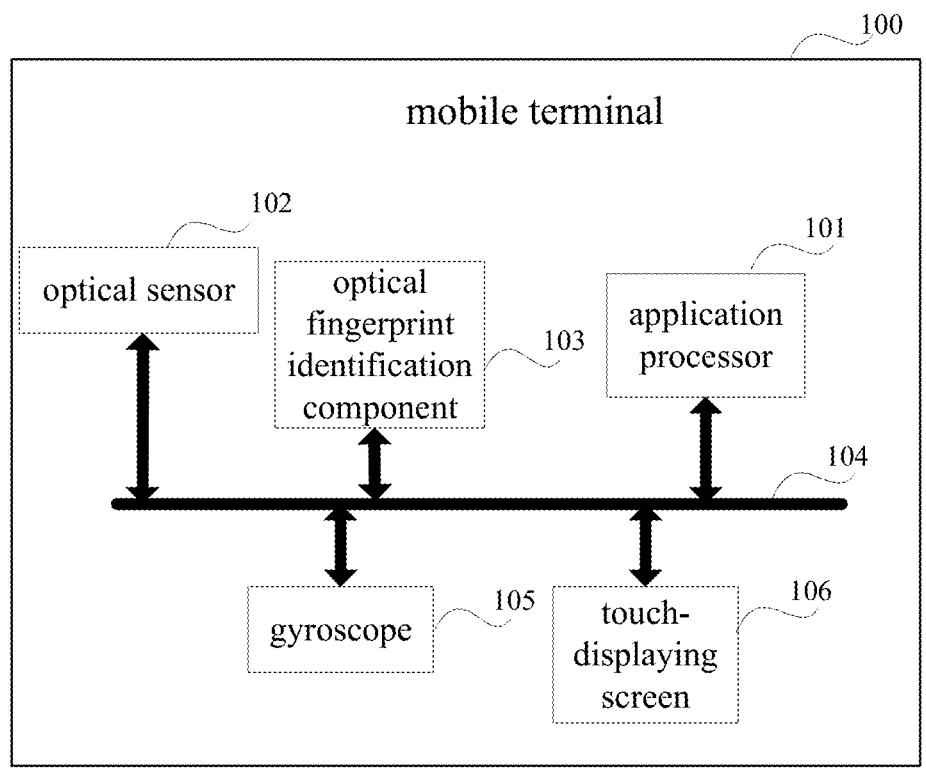
FIG. 1d is a structure diagram of a mobile terminal according to yet another embodiment of the present disclosure.

In an embodiment, as illustrated in FIG. 1d, the mobile terminal further includes a touch-displaying screen 106.

A fingerprint identification region of the optical fingerprint identification component is located in a first region of the touch-displaying screen 106. The fingerprint collecting instruction is generated when the touch-displaying screen 106 detects a touch operation of the user in the first region.

Figure 1E:
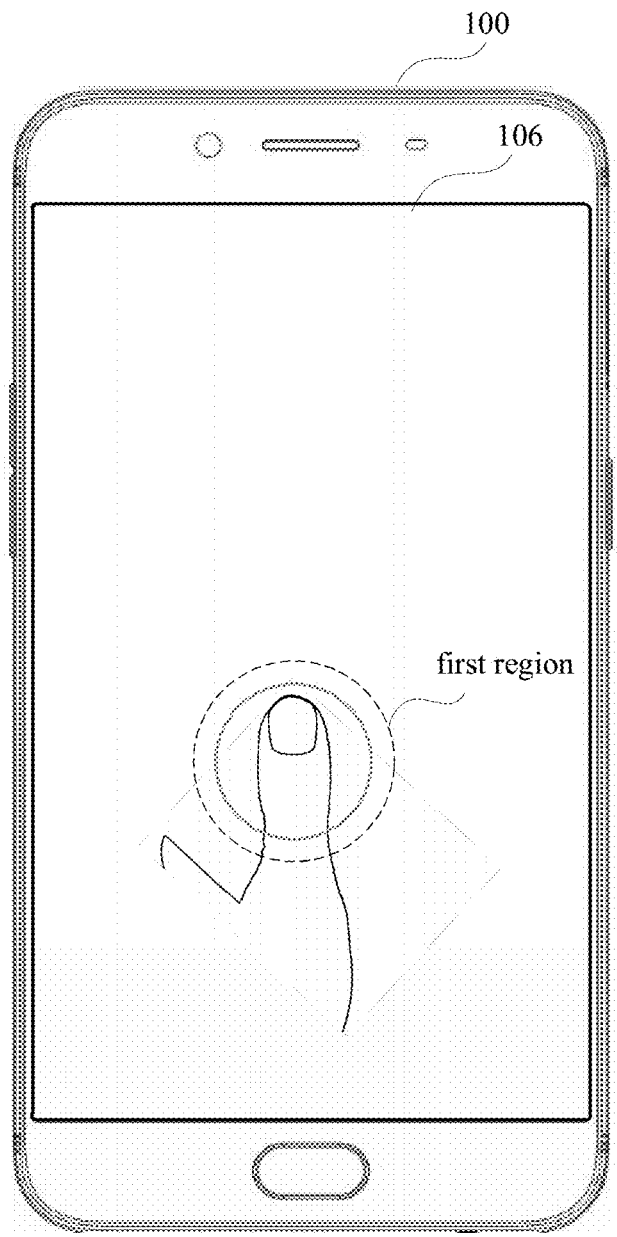
FIG. 1e is a schematic diagram illustrating a fingerprint identification region according to an embodiment of the present disclosure.

In embodiments of the present disclosure, when the user touches the first region of the touch-displaying screen 106, the fingerprint collecting instruction is generated. The first region may be any preset region of the touch-displaying screen 106. The preset region may be located on a top-left side (as illustrated in FIG. 1e), a top side, a bottom side, a left side, a right side etc. of the touch-displaying screen 106. An area of the first region satisfies a requirement of accommodating the fingerprint of the finger. A shape of the preset region may be a circle, an ellipse, a quadrangle (such as a rectangle), a shape like the fingerprint of the finger and so on, which will not be limited herein.

The touch-displaying screen 106 described in embodiments of the present disclosure may be a thin film transistor-liquid crystal display (TFT-LCD), a light emitting diode (LED) display, an organic light-emitting diode (OLED) display or the like.

The touch-displaying screen 106 described in embodiments of the present disclosure may include a touch screen and a displaying screen. The touch screen and the displaying screen are overlapped, and the displaying screen is set on a lower surface of the touch screen.

In embodiments of the present disclosure, when the AP performs a fingerprint data matching, different sets of fingerprint template data may be selected according to different external ambient light intensities. Therefore, influence of the external ambient light on the optical fingerprint matching may be reduced, thereby improving a success rate of the optical fingerprint matching.

Figure 2:
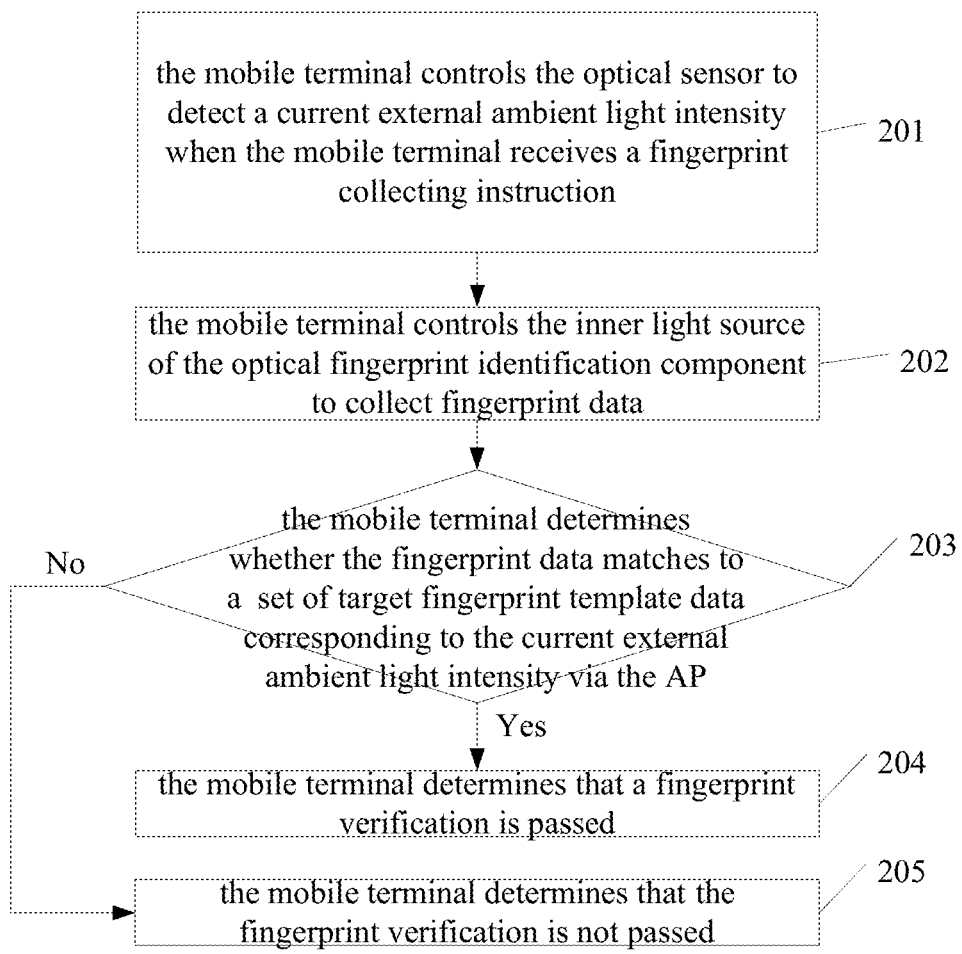
FIG. 2 is a flow chart of an optical fingerprint verification method according to an embodiment of the present disclosure.

Referring to FIG. 2, FIG. 2 is a flow chart of an optical fingerprint verification method according to an embodiment of the present disclosure. The method is applied to a mobile terminal including an AP, an optical sensor, and an optical fingerprint identification component including an inner light source. As illustrated in FIG. 2, the method includes followings.

At block 201, the mobile terminal controls the optical sensor to detect a current external ambient light intensity when the mobile terminal receives a fingerprint collecting instruction.

At block 202, the mobile terminal controls the inner light source of the optical fingerprint identification component to collect fingerprint data.

At block 203, the mobile terminal determines whether the fingerprint data matches to a set of target fingerprint template data corresponding to the current external ambient light intensity via the AP, and when the fingerprint data matches to the set of target fingerprint template data, the act at block 204 is performed, otherwise, the act at block 205 is performed.

At block 204, the mobile terminal determines that a fingerprint verification is passed.

At block 205, the mobile terminal determines that the fingerprint verification is not passed.

It should be noted that acts at blocks 201 and 202 may be performed simultaneously, i.e., the mobile terminal may detect the current external ambient light intensity when collecting the fingerprint data.

In embodiments of the present disclosure, when the mobile terminal performs the fingerprint data matching, different sets of fingerprint template data may be selected according to different external ambient light intensities. Therefore, influence of the external ambient light on the optical fingerprint matching may be reduced, thereby improving a success rate of the optical fingerprint matching.

In an embodiment of the present disclosure, the method may further include acquiring, by the mobile terminal, the set of target fingerprint template data via the AP according to a target external ambient light intensity range including the current external ambient light intensity and a correspondence between a plurality of external ambient light intensity ranges and a plurality of sets of fingerprint template data.

After the mobile terminal obtains the current external ambient light intensity, the mobile terminal may determine the target external ambient light intensity range including the current external ambient light intensity, and then the mobile terminal acquires a set of fingerprint template data corresponding to the target external ambient light intensity range as the set of target fingerprint template data, based on the correspondence between a plurality of external ambient light intensity ranges and sets of fingerprint template data.

Figure 3:
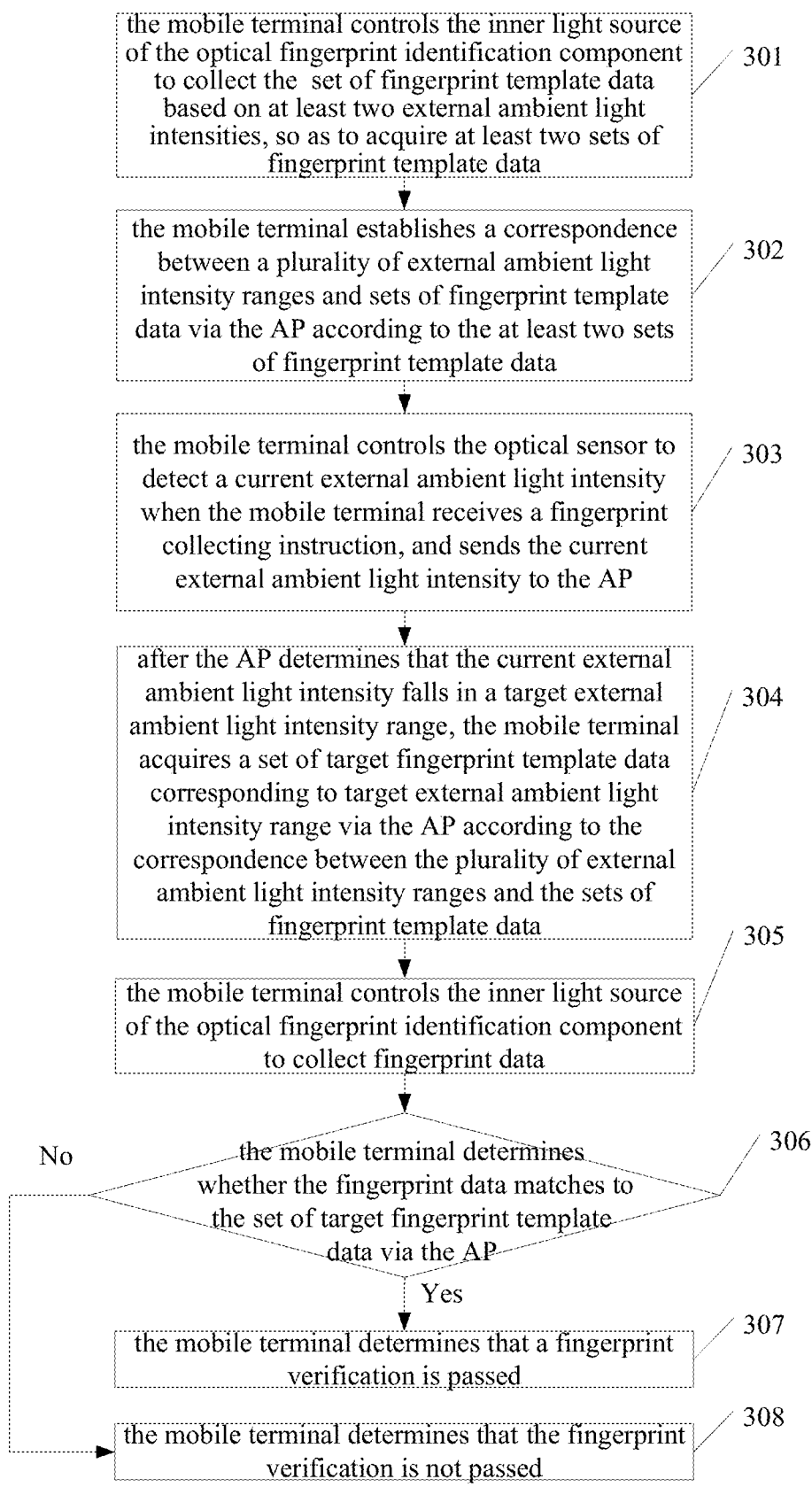
FIG. 3 is a flow chart of an optical fingerprint verification method according to another embodiment of the present disclosure.

Referring to FIG. 3, FIG. 3 is a flow chart of an optical fingerprint verification method according to another embodiment of the present disclosure. The method is applied to a mobile terminal including an AP, an optical sensor, and an optical fingerprint identification component including an inner light source. As illustrated in FIG. 3, the method includes followings.

At block 301, the mobile terminal controls the inner light source of the optical fingerprint identification component to collect a set of fingerprint template data based on at least two external ambient light intensities, so as to acquire at least two sets of fingerprint template data.

In an embodiment, the act at block 301 may include followings.

(11). The mobile terminal controls the inner light source of the optical fingerprint identification component to collect at least four sets of original fingerprint data based on at least two external ambient light intensities with at least two light intensities of the inner light source.

(12). The mobile terminal selects a set of original fingerprint data with a minimum noise from at least two sets of original fingerprint data collected based on a first external ambient light intensity, and sets the set of original fingerprint data with the minimum noise as the set of fingerprint template data corresponding to the first external ambient light intensity. The first external ambient light intensity is selected from the at least two external ambient light intensities.

By performing the acts (11) and (12), the set of fingerprint template data with the minimum noise may be used, such that the success rate of fingerprint matching may be further improved.

At block 302, the mobile terminal establishes a correspondence between a plurality of external ambient light intensity ranges and sets of fingerprint template data via the AP according to the at least two sets of fingerprint template data.

At block 303, the mobile terminal controls the optical sensor to detect a current external ambient light intensity when the mobile terminal receives a fingerprint collecting instruction, and sends the current external ambient light intensity to the AP.

At block 304, after the AP determines that the current external ambient light intensity falls in a target external ambient light intensity range, the mobile terminal acquires a set of target fingerprint template data corresponding to the target external ambient light intensity range via the AP according to the correspondence between the plurality of external ambient light intensity ranges and the sets of fingerprint template data.

At block 305, the mobile terminal controls the inner light source of the optical fingerprint identification component to collect fingerprint data.

At block 306, the mobile terminal determines whether the fingerprint data matches to the set of target fingerprint template data via the AP, and when the fingerprint data matches to the set of target fingerprint template data, the act at block 307 is performed, otherwise, the act at block 308 is performed.

At block 307, the mobile terminal determines that a fingerprint verification is passed.

At block 308, the mobile terminal determines that the fingerprint verification is not passed.

In embodiments of the present disclosure, when the mobile terminal collects the set of fingerprint template data, the correspondence between the plurality of external ambient light intensity ranges and the sets of fingerprint template data may be established according to the at least two sets of fingerprint template data collected based on at least two external ambient light intensities. When performing the fingerprint data matching, different sets of fingerprint template data may be selected according to different external ambient light intensities. Therefore, influence of the external ambient light on the optical fingerprint matching may be reduced, thereby improving a success rate of the optical fingerprint matching.

Figure 4:
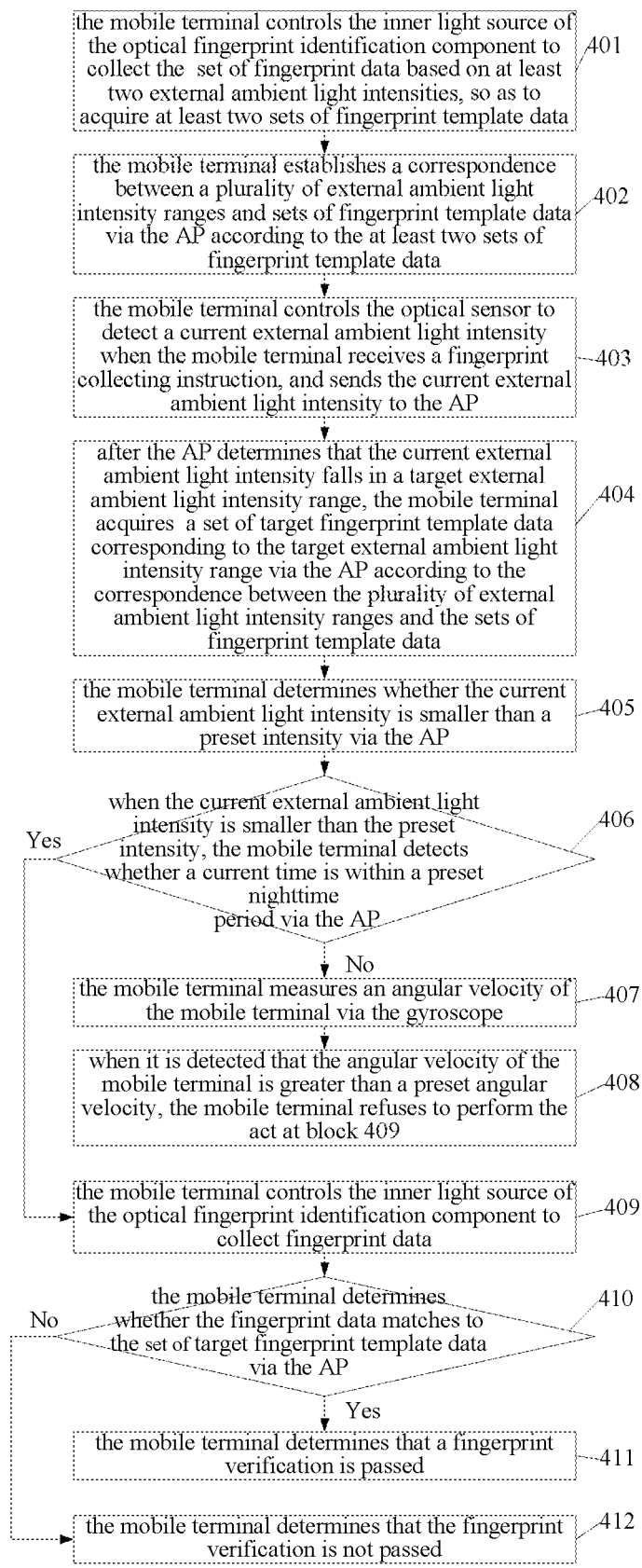
FIG. 4 is a flow chart of an optical fingerprint verification method according to yet another embodiment of the present disclosure.

Referring to FIG. 4, FIG. 4 is a flow chart of an optical fingerprint verification method according to yet another embodiment of the present disclosure. The method is applied to a mobile terminal including an AP, an optical sensor, a gyroscope and an optical fingerprint identification component including an inner light source. As illustrated in FIG. 4, the method includes followings.

At block 401, the mobile terminal controls the inner light source of the optical fingerprint identification component to collect a set of fingerprint template data based on at least two external ambient light intensities, so as to acquire at least two sets of fingerprint template data.

At block 402, the mobile terminal establishes a correspondence between a plurality of external ambient light intensity ranges and sets of fingerprint template data via the AP according to the at least two sets of fingerprint template data.

At block 403, the mobile terminal controls the optical sensor to detect a current external ambient light intensity when the mobile terminal receives a fingerprint collecting instruction, and sends the current external ambient light intensity to the AP.

At block 404, after the AP determines that the current external ambient light intensity falls in a target external ambient light intensity range, the mobile terminal acquires a set of target fingerprint template data corresponding to the target external ambient light intensity range via the AP according to the correspondence between the plurality of external ambient light intensity ranges and the sets of fingerprint template data.

At block 405, the mobile terminal determines whether the current external ambient light intensity is smaller than a preset intensity via the AP.

At block 406, when the current external ambient light intensity is smaller than the preset intensity, the mobile terminal detects whether a current time is within a preset nighttime period via the AP, and when the current time is within the preset nighttime period, the act at block 409 is performed, otherwise, the act at block 407 is performed.

At block 407, the mobile terminal measures an angular velocity of the mobile terminal via the gyroscope.

At block 408, when it is detected that the angular velocity of the mobile terminal is greater than a preset angular velocity, the mobile terminal refuses to perform the act at block 409.

At block 409, the mobile terminal controls the inner light source of the optical fingerprint identification component to collect fingerprint data.

At block 410, the mobile terminal determines whether the fingerprint data matches to the set of target fingerprint template data via the AP, and when the fingerprint data matches to the set of target fingerprint template data, the act at block 411 is performed, otherwise, the act at block 412 is performed.

At block 411, the mobile terminal determines that a fingerprint verification is passed.

At block 412, the mobile terminal determines that the fingerprint verification is not passed.

In embodiments of the present disclosure, when the mobile terminal collects the set of fingerprint template data, the correspondence between the plurality of external ambient light intensity ranges and the sets of fingerprint template data may be established according to the at least two sets of fingerprint template data collected based on at least two external ambient light intensities. When performing the fingerprint data matching, different sets of fingerprint template data may be selected according to different external ambient light intensities. Therefore, influence of the external ambient light on the optical fingerprint matching may be reduced, thereby improving a success rate of the optical fingerprint matching. By implementing embodiments of the present disclosure, fingerprint collection caused by the spurious triggering may be avoided without triggering the inner light source of the optical fingerprint identification component to work, thereby reducing power consumption of the optical fingerprint identification component.

Figure 5:
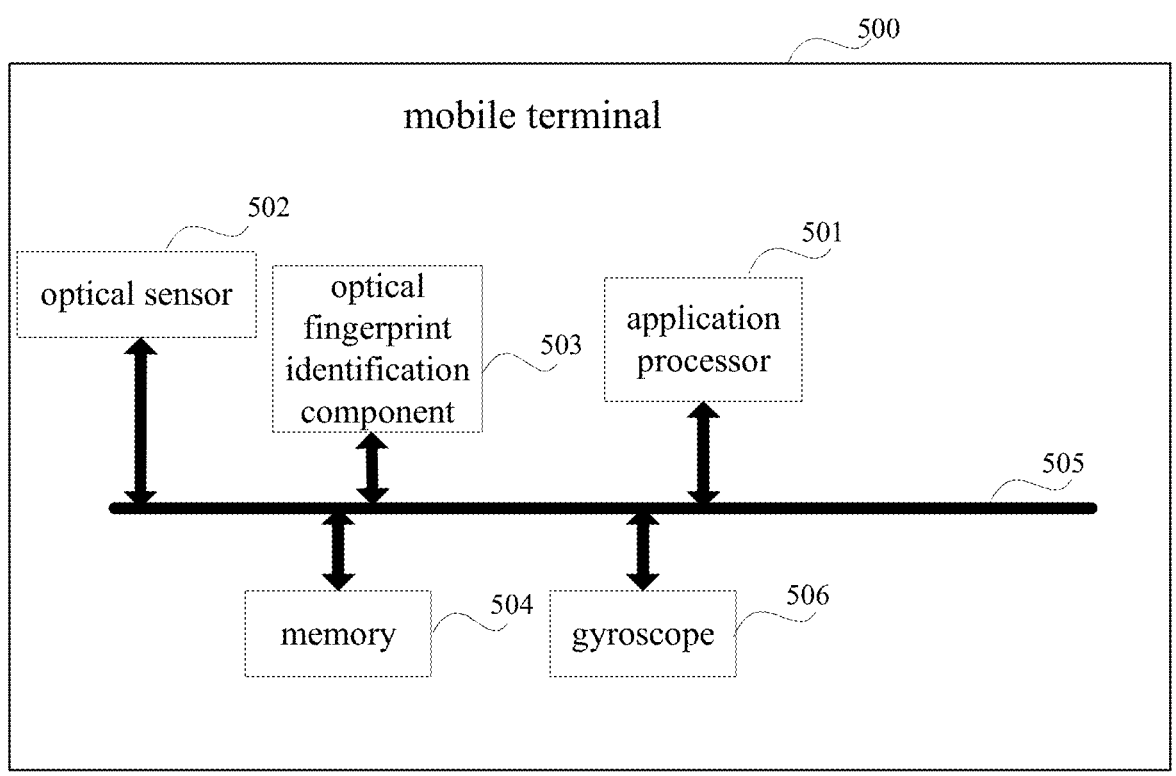
FIG. 5 is a structure diagram of a mobile terminal according to another embodiment of the present disclosure.

Referring to FIG. 5, FIG. 5 is a structure diagram of a mobile terminal according to another embodiment of the present disclosure. The mobile terminal 500 may include an AP 501, an optical sensor 502, and an optical fingerprint identification component 503, a memory 504 and one or more programs. The optical fingerprint identification component 503 includes an inner light source, and the AP 101 is coupled to the optical sensor 502, the optical fingerprint identification component 503 and the memory 504 via a bus 505.

The one or more programs are stored in the memory 504 and configured to be executed by the AP 501. The one or more programs include instructions for performing acts of:

controlling the optical sensor 502 to detect a current external ambient light intensity when a fingerprint collecting instruction is received; controlling the inner light source of the optical fingerprint identification component 503 to collect fingerprint data; and determining whether the fingerprint data matches to a set of target fingerprint template data corresponding to the external ambient light intensity via the AP 501, and when the fingerprint data matches to the set of target fingerprint template data, determining that a fingerprint verification is passed.

In an embodiment, the one or more programs include instructions to perform acts of: acquiring the set of target fingerprint template data via the AP 501 according to a target external ambient light intensity range comprising the external ambient light intensity and a correspondence between a plurality of external ambient light intensity ranges and sets of fingerprint template data.

In an embodiment, the one or more programs include instructions to perform acts of: controlling the inner light source of the optical fingerprint identification component 503 to collect the set of fingerprint template data based on at least two external ambient light intensities, so as to acquire at least two sets of fingerprint template data; and establishing the correspondence between the plurality of external ambient light intensity ranges and the sets of fingerprint template data via the AP 501 according to the at least two sets of fingerprint template data.

In an embodiment, controlling the inner light source of the optical fingerprint identification component 503 to collect the set of fingerprint template data based on at least two external ambient light intensities so as to acquire at least two sets of fingerprint template data may include: controlling the inner light source of the optical fingerprint identification component 503 to collect at least four sets of original fingerprint data based on the at least two external ambient light intensities with at least two light intensities of the inner light source; and selecting a set of original fingerprint data with a minimum noise from at least two sets of original fingerprint data collected based on a first external ambient light intensity, determining the set of original fingerprint data with the minimum noise as a set of fingerprint template data corresponding to the first external ambient light intensity, in which the first external ambient light intensity is selected from the at least two external ambient light intensities.

In an embodiment, the one or more programs further include instructions to perform acts of: determining whether the current external ambient light intensity is smaller than a preset intensity via the AP 501; when the current external ambient light intensity is smaller than the preset intensity, detecting whether a current time is within a preset nighttime period via the AP 501; and when the current time is within the preset nighttime period, controlling the inner light source of the optical fingerprint identification component to collect the fingerprint data.

In an embodiment, the mobile terminal further includes a gyroscope 506, and the one or more programs include instructions to perform acts of: when the current time is not within the preset nighttime period, measuring an angular velocity of the mobile terminal via the gyroscope; and when it is detected that the angular velocity of the mobile terminal is greater than a preset angular velocity, controlling the inner light source of the optical fingerprint identification component not to collect the fingerprint data.

In embodiments of the present disclosure, when the mobile terminal performs the fingerprint data matching, different sets of fingerprint template data may be selected according to different external ambient light intensities. Therefore, influence of the external ambient light on the optical fingerprint matching may be reduced, thereby improving a success rate of the optical fingerprint matching.

Figure 6:
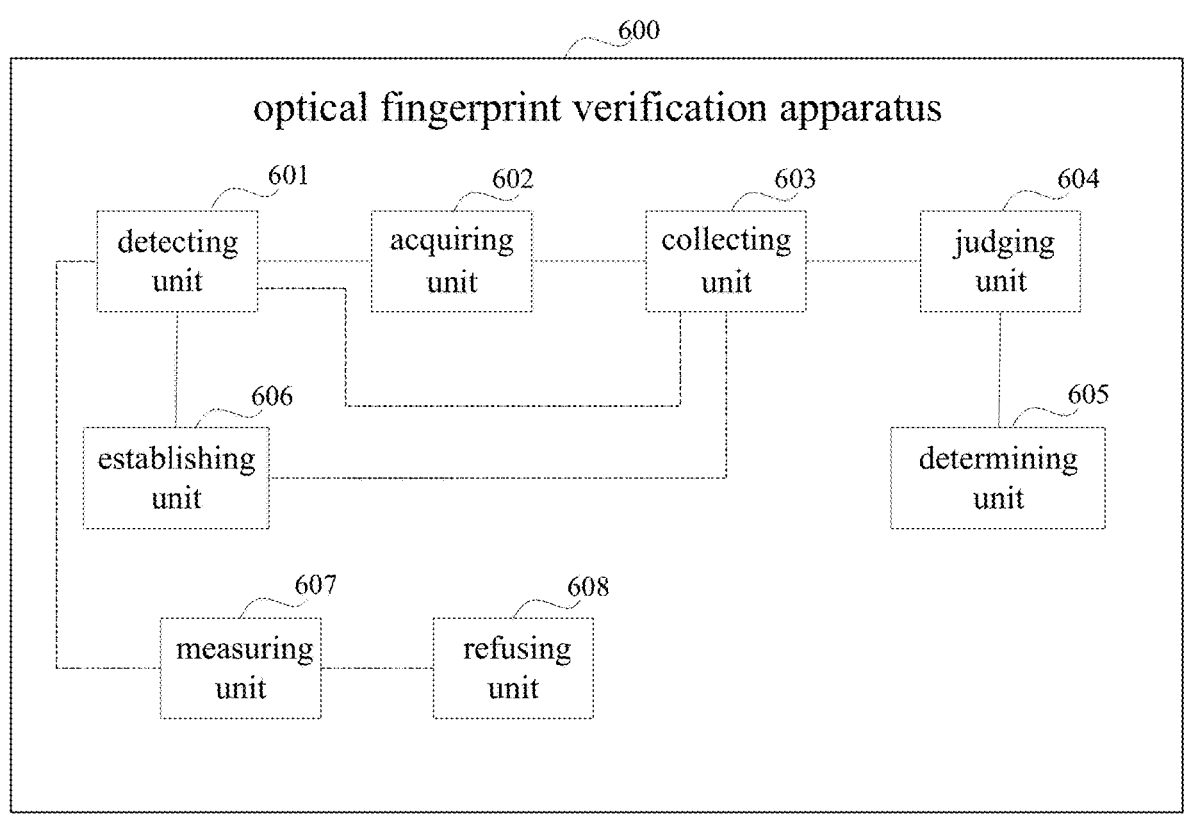
FIG. 6 is a block diagram of an optical fingerprint verification apparatus according to an embodiment of the present disclosure.

Referring to FIG. 6, FIG. 6 is a block diagram of an optical fingerprint verification apparatus according to an embodiment of the present disclosure. The apparatus 600 is applied to a mobile terminal including an AP, an optical sensor, and an optical fingerprint identification component including an inner light source. The apparatus 600 may include a detecting unit 601, an acquiring unit 602, a collecting unit 603, a judging unit 604 and a determining unit 605.

The detecting unit 601 is configured to control the optical sensor to detect a current external ambient light intensity when the mobile terminal receives a fingerprint collecting instruction, and to send the current external ambient light intensity to the AP.

The acquiring unit 602 is configured to acquire a set of target fingerprint template data corresponding to a target external ambient light intensity range via the AP according to a correspondence between a plurality of external ambient light intensity ranges and sets of fingerprint template data after the AP determines that the external ambient light intensity falls in the target external ambient light intensity range.

The collecting unit 603 is configured to control the inner light source of the optical fingerprint identification component to collect fingerprint data.

The judging unit 604 is configured to determine whether the fingerprint data matches to the set of target fingerprint template data via the AP.

The determining unit 605 is configured to determine that a fingerprint verification is passed when the judging unit determines that the fingerprint data matches to the set of target fingerprint template data.

In an embodiment, the collecting unit 603 is further configured to control the inner light source of the optical fingerprint identification component to collect the set of fingerprint template data based on at least two external ambient light intensities, so as to acquire at least two sets of fingerprint template data.

The apparatus 600 further includes an establishing unit 606, configured to establish the correspondence between the plurality of external ambient light intensity ranges and the sets of fingerprint template data via the AP according to the at least two sets of fingerprint template data.

In an embodiment, when the collecting unit 603 controls the inner light source of the optical fingerprint identification component to collect the set of fingerprint template data based on at least two external ambient light intensities, so as to acquire at least two sets of fingerprint template data, the collecting unit 603 is configured to: control the inner light source of the optical fingerprint identification component to collect at least four sets of original fingerprint data based on the at least two external ambient light intensities with at least two light intensities of the inner light source; select a set of original fingerprint data with a minimum noise from at least two sets of original fingerprint data collected based on a first external ambient light intensity, determine the set of original fingerprint data with the minimum noise as the set of fingerprint template data corresponding to the first external ambient light intensity. The first external ambient light intensity is selected from the at least two external ambient light intensities.

In an embodiment, the judging unit 604 is configured to determine whether the current external ambient light intensity is smaller than a preset intensity via the AP.

The detecting unit 601 is further configured to detect whether a current time is within a preset nighttime period via the AP when the current external ambient light intensity is smaller than the preset intensity.

The collecting unit 603 is configured to control the inner light source of the optical fingerprint identification component to collect the fingerprint data when the current time is within the preset nighttime period.

In an embodiment, the apparatus 600 further includes: a measuring unit 607 and a refusing unit 608.

The measuring unit 607 is configured to measure an angular velocity of the mobile terminal via the gyroscope when the current time is not within the preset nighttime period.

The refusing unit 608 is configured to control the inner light source of the optical fingerprint identification component not to collect the fingerprint data when it is detected that the angular velocity of the mobile terminal is greater than a preset angular velocity.

In embodiments of the present disclosure, when the mobile terminal performs the fingerprint data matching, different sets of fingerprint template data may be selected according to different external ambient light intensities. Therefore, influence of the external ambient light on the optical fingerprint matching may be reduced, thereby improving a success rate of the optical fingerprint matching.

Figure 7:
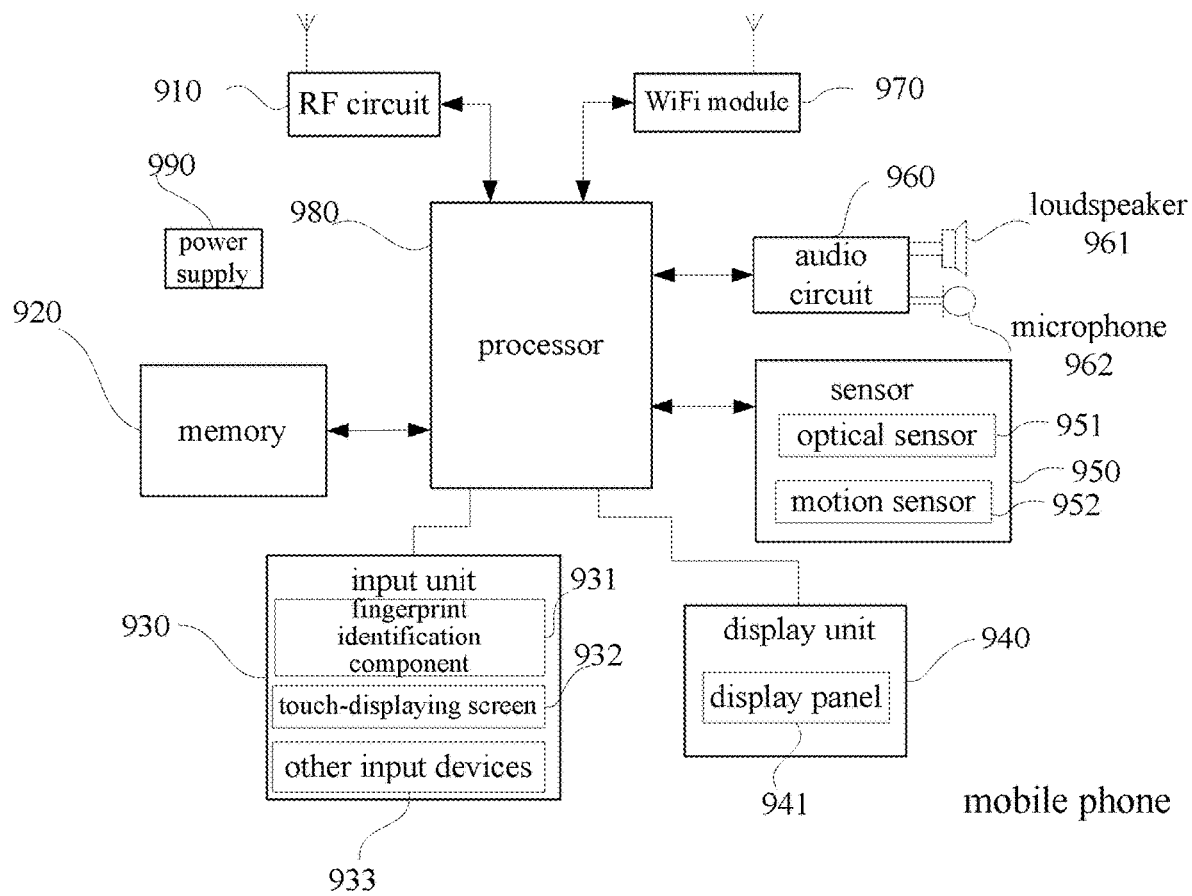
FIG. 7 is a structure diagram of a mobile terminal according to yet another embodiment of the present disclosure.

Embodiments of the present disclosure also provide another mobile terminal, as illustrated in FIG. 7. For convenience of description, parts related to embodiments of the present disclosure are illustrated only. Regarding specific technical details which are not disclosed, reference can be made to the description of the method embodiments. The mobile terminal may include a mobile phone, a tablet computer, a personal digital assistant (PDA), a point of sales (POS), a vehicle-mounted computer and the like. The present disclosure takes the mobile phone as an example.

FIG. 7 illustrates a structure diagram of a mobile phone related to the mobile terminal provided by embodiments of the present disclosure. Referring to FIG. 7, the mobile phone may include a radio frequency (RF) circuit 910, a memory 920, an input unit 930, a display unit 940, a sensor 950, an audio circuit 960, a wireless fidelity (WiFi) component 970, a processor 980, and a power supply 990. It will be understood by those skilled in the art that the structure illustrated in FIG. 7 does not constitute a limitation on the mobile phone. Compared to the drawing illustrated, more or fewer components may be included, or a combination of some components or different component arrangements may also be possible.

Respective components of the mobile phone will be described in detail with reference to FIG. 7.

The RF circuit 910 may be configured to receive and send information. Generally, the RF circuit 910 includes, but is not limited to, an antenna, at least one amplifier, a transceiver, a coupler, a low noise amplifier (LNA), a duplexer and the like. In addition, the RF circuit 910 may also communicate with another device by a network and wireless communication. The wireless communication may use any communication standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be configured to store a software program and components. The processor 980 runs the software program and components stored in the memory 920, to implement various functional applications and data processes of the mobile phone. The memory 920 may mainly include a program storage area and a data storage area. The program storage area may store an operating system, an application program required by at least one function and the like. The data storage area may store data created according to usage of the mobile phone, and the like. In addition, the memory 920 may include a high speed random access memory, and may also include a non-volatile memory such as at least one magnetic disk storage device, a flash memory, or another volatile solid-state storage device.

The input unit 930 may be configured to receive input digital or character information, and a key signal input related to user's setup and functional control of the mobile phone. Specifically, the input unit 930 may include a fingerprint identification component 931 (such as an optical fingerprint identification component), a touch-displaying screen 932 and other input devices 933. The fingerprint identification component 931 may collect fingerprint data inputted by the user thereon. The input unit 930 may also include other input devices 933 besides the fingerprint identification component 931. Specifically, other input devices 933 may include but not be limited to one or more of a physical button, a functional button (such as a volume control button, an ON-OFF button and the like), a trackball, a mouse and a joystick.

The display unit 940 may be configured to display information input by the user or information provided for the user, and various menus of the mobile phone. The display unit 940 may include a display panel 941. Optionally, the display panel 941 may be configured by using a liquid crystal display (LCD), an organic light-emitting diode (OLED), or the like. In FIG. 7, although the fingerprint identification component 931 and the display panel 941 may be used as two separate components to realize the input and output function of the mobile phone, in some embodiments, the fingerprint identification component 931 and the display panel 941 may be integrated to realize the input and playing function of the mobile phone.

The mobile phone may further include at least one sensor 950, such as an optical sensor 951, a motion sensor 952 and other sensors. Specifically, the optical sensor 951 may include an ambient light sensor and a proximity sensor. The ambient light sensor can adjust luminance of the display panel 941 according to brightness of the ambient light. The proximity sensor may switch off the display panel 941 and/or backlight when the mobile phone is moved to the ear. As one type of motion sensor 952, an acceleration sensor can detect acceleration values in various directions (generally on three axes), may detect magnitude and a direction of the gravity when the mobile phone is static, and may be applied to an application that recognizes the attitude of the mobile phone (for example, landscape/portrait screen switching, a related game, and magnetometer attitude calibration), a function related to vibration recognition (such as a pedometer and a knocking), and the like. In addition, the mobile phone can be configured with other sensors, such as a barometer, a hygrometer, a thermometer, and an infrared sensor, which are not further described herein.

The audio circuit 960, a loudspeaker 961, and a microphone 962 may provide audio interfaces between the user and the mobile phone. The audio circuit 960 may convert received audio data into an electrical signal and transmit the electrical signal to the loudspeaker 961. The loudspeaker 961 converts the electrical signal into a sound signal for outputting. On the other hand, the microphone 962 converts a collected sound signal into an electrical signal. The audio circuit 960 receives the electrical signal and converts the electrical signal into audio data, and outputs the audio data to the processor 980 for processing. Then, the processor 980 sends the audio data to, for example, another mobile terminal by using the RF circuit 910, or outputs the audio data to the memory 920 for further processing.

WiFi is a short distance wireless transmission technology. The mobile phone may help, by using the WiFi component 970, the user to receive and send e-mails, browse a webpage, access streaming media, and so on. The WiFi component 970 provides wireless broadband Internet access for the user. Although the WiFi component 970 is illustrated in FIG. 7, it can be understood that, the WiFi component 970 is not essential for the mobile phone, and may be omitted when required as long as the scope of the essence of the present disclosure is not changed.

The processor 980 is a control center of the mobile phone, which can use various interfaces and wires to couple respective parts of the mobile phone, and perform various functions and processing data of the mobile phone by running or executing software programs and/or components stored in the memory 920 and calling data stored in the memory 920, so as to monitor the mobile phone overall. In an embodiment, the processor 980 may include one or more processing units. In an embodiment, the processor 980 may integrate an application processor and a modem processor, in which the application processor is mainly configured to process the operating system, the user interface and applications, and the modem processor is mainly configured to process wireless communication. It could be understood that the above-described modem processor may be not integrated in the processor 980.

The mobile phone further includes the power supply 990 (such as a battery) for supplying power to the components. In an embodiment, the power supply may be logically coupled with the processor 980 by using a power management system, thereby implementing functions such as charging, discharging and power consumption management by using the power management system.

Although not illustrated in the figure, the mobile phone may further include a camera, a Bluetooth component and the like, which is not further described herein.

Embodiments of the present disclosure also provide a computer readable storage medium having computer programs for exchanging digital data stored thereon, in which the computer programs are executed to perform all or a part of acts of the method according to the above method embodiments of the present disclosure.

Embodiments of the present disclosure also provide a computer program product including a non-transitory computer-readable medium storing computer programs, in which the computer programs are executed to perform all or a part of acts of the method according to the above method embodiments of the present disclosure.

It should be noted that, for convenience and simplicity of description, the above method embodiments are described in a form of a combination of a series of steps. However, those skilled in the art can understand clearly that, the present disclosure is not limited by the order of the steps, since some steps may be performed simultaneously or in other orders according to present disclosure. In addition, those skilled in the art can understand clearly that, the described embodiments are preferred embodiments, of which relative steps or components may be unnecessary for the present disclosure.

In above embodiments, each embodiment may be described with focusing on different aspects. Parts not be described in some embodiments may refer to relative descriptions in other embodiments.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated unit is implemented in form of functional software units and are sold or used as separate products, it can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

It should be understood that all or a part of the method provided by the present disclosure may be realized by programs instructing relative hardware, the programs may be stored in a computer-readable memory. The memory may include a flash disk, an ROM, an RAM, a magnet disk, a light disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. An optical fingerprint verification method, applied to a mobile terminal comprising an application processor (AP), an optical sensor, and an optical fingerprint identification component, wherein the method comprises:

controlling, by the mobile terminal, the optical sensor to detect an external ambient light intensity when the mobile terminal acquires a fingerprint collecting instruction;

controlling, by the mobile terminal, the optical fingerprint identification component to collect fingerprint data;

determining, by the AP of the mobile terminal, whether the fingerprint data matches to a set of target fingerprint template data corresponding to the external ambient light intensity, and when the fingerprint data matches to the set of target fingerprint template data, determining by the mobile terminal that a fingerprint verification is passed.

2. The method according to claim 1, wherein the method further comprises:

acquiring, by the AP of the mobile terminal, the set of target fingerprint template data according to a target external ambient light intensity range and a correspondence between a plurality of external ambient light intensity ranges and sets of fingerprint template data, wherein the target external ambient light intensity range comprises the external ambient light intensity.

3. The method according to claim 2, wherein the method further comprises:

controlling, by the mobile terminal, the optical fingerprint identification component to collect the set of fingerprint template data based on at least two external ambient light intensities, so as to acquire at least two sets of fingerprint template data; and establishing, by the AP of the mobile terminal, the correspondence between the plurality of external ambient light intensity ranges and the sets of fingerprint template data according to the at least two sets of fingerprint template data.

4. The method according to claim 3, wherein the optical fingerprint identification component comprises an inner light source, and controlling, by the mobile terminal, the optical fingerprint identification component to collect the set of fingerprint template data based on the at least two external ambient light intensities so as to acquire at least two sets of fingerprint template data comprises:

controlling, by the mobile terminal, the inner light source of the optical fingerprint identification component to collect at least four sets of original fingerprint data based on the at least two external ambient light intensities with at least two light intensities of the inner light source; and selecting, by the mobile terminal, a set of original fingerprint data with a minimum noise from at least two sets of original fingerprint data collected based on a first external ambient light intensity, determining the set of original fingerprint data with the minimum noise as a set of fingerprint template data corresponding to the first external ambient light intensity, wherein the first external ambient light intensity is selected from the at least two external ambient light intensities.

5. The method according to claim 4, wherein when the external ambient light intensity is the first external ambient light intensity, controlling, by the mobile terminal, the optical fingerprint identification component to collect fingerprint data comprises:

determining a first light intensity of the inner light source, wherein the set of original fingerprint data with the minimum noise is collected by the inner light source based on the first external ambient light intensity with the first light intensity;

controlling the inner light source of the optical fingerprint identification component to collect the fingerprint data with the first light intensity.

6. The method according to claim 1, wherein the method further comprises:

determining, by the AP of the mobile terminal, whether the external ambient light intensity is smaller than a preset intensity;

when the external ambient light intensity is smaller than the preset intensity, detecting, by the AP of the mobile terminal, whether a current time is within a preset nighttime period; and when the current time is within the preset nighttime period, controlling the optical fingerprint identification component to collect the fingerprint data.

7. The method according to claim 2, wherein the method further comprises:

determining, by the AP of the mobile terminal, whether the external ambient light intensity is smaller than a preset intensity;

when the external ambient light intensity is smaller than the preset intensity, detecting, by the AP of the mobile terminal, whether a current time is within a preset nighttime period; and when the current time is within the preset nighttime period, controlling the optical fingerprint identification component to collect the fingerprint data.

8. The method according to claim 3, wherein the method further comprises:

determining, by the AP of the mobile terminal, whether the external ambient light intensity is smaller than a preset intensity;

when the external ambient light intensity is smaller than the preset intensity, detecting, by the AP of the mobile terminal, whether a current time is within a preset nighttime period; and when the current time is within the preset nighttime period, controlling the optical fingerprint identification component to collect the fingerprint data.

9. The method according to claim 6, wherein the mobile terminal further comprises a gyroscope, and the method further comprises:

when the current time is outside the preset nighttime period, measuring an angular velocity of the mobile terminal via the gyroscope; and when it is detected that the angular velocity of the mobile terminal is greater than a preset angular velocity, controlling, by the mobile terminal, the optical fingerprint identification component not to collect the fingerprint data.

10. The method according to claim 1, wherein controlling, by the mobile terminal, the optical sensor to detect an external ambient light intensity comprises:

controlling the optical sensor to detect a total intensity of external ambient light as the external ambient light intensity.

11. The method according to claim 1, wherein controlling, by the mobile terminal, the optical sensor to detect an external ambient light intensity comprises:

controlling the optical sensor to detect an intensity of external ambient light with the same wavelength as light emitted by an inner light source of the optical fingerprint identification component and determining the detected intensity of external ambient light as the external ambient light intensity.

12. The method according to claim 1, wherein the mobile terminal further comprises a touch-displaying screen having a first region, and the method further comprises:
  detecting, by the mobile terminal, a touch operation of a user in the first region to acquire the fingerprint collecting instruction.

13. A mobile terminal, comprising an application processor (AP), an optical sensor, and an optical fingerprint identification component, wherein,
  the optical sensor is configured to detect an external ambient light intensity when the mobile terminal acquires a fingerprint collecting instruction;
  the optical fingerprint identification component is configured to collect fingerprint data;
  the AP is configured to determine whether the fingerprint data matches to a set of target fingerprint template data corresponding to the external ambient light intensity and to determine that a fingerprint verification is passed when the fingerprint data matches to the set of target fingerprint template data.

14. The mobile terminal according to claim 13, wherein,
  the AP is further configured to acquire the set of target fingerprint template data according to a target external ambient light intensity range and a correspondence between a plurality of external ambient light intensity ranges and sets of fingerprint template data, wherein the target external ambient light intensity range comprises the external ambient light intensity.

15. The mobile terminal according to claim 14, wherein,
  the optical fingerprint identification component is further configured to collect the set of fingerprint template data based on at least two external ambient light intensities so as to acquire at least two sets of fingerprint template data; and
  the AP is further configured to establish the correspondence between the plurality of external ambient light intensity ranges and the sets of fingerprint template data according to the at least two sets of fingerprint template data.

16. The mobile terminal according to claim 15, wherein the optical fingerprint identification component comprises an inner light source, and when the optical fingerprint identification component collects the set of fingerprint template data based on the at least two external ambient light intensities so as to acquire at least two sets of fingerprint template data, the optical fingerprint identification component is configured to:
  control the inner light source to collect at least four sets of original fingerprint data based on the at least two external ambient light intensities with at least two light intensities of the inner light source; and
  select a set of original fingerprint data with a minimum noise from at least two sets of original fingerprint data collected based on a first external ambient light intensity, determine the set of original fingerprint data with the minimum noise as a set of fingerprint template data corresponding to the first external ambient light intensity, wherein the first external ambient light intensity is selected from the at least two external ambient light intensities.

17. The mobile terminal according to claim 16, wherein when the external ambient light intensity is the first external ambient light intensity, and the optical fingerprint identification component collects the fingerprint data, the optical fingerprint identification component is configured to:
  determine a first light intensity of the inner light source, wherein the set of original fingerprint data with the minimum noise is collected by the inner light source based on the first external ambient light intensity with the first light intensity;
  control the inner light source of the optical fingerprint identification component to collect the fingerprint data with the first light intensity.

18. The mobile terminal according to claim 13, wherein,
  the AP is further configured to determine whether the external ambient light intensity is smaller than a preset intensity;
  the AP is further configured to detect whether a current time is within a preset nighttime period when the external ambient light intensity is smaller than the preset intensity; and
  the optical fingerprint identification component is configured to collect the fingerprint data when the current time is within the preset nighttime period.

19. The mobile terminal according to claim 18, wherein the mobile terminal further comprises a gyroscope,
  the gyroscope is configured to measure an angular velocity of the mobile terminal when the current time is beyond the preset nighttime period; and
  the AP is configured to control the inner light source of the optical fingerprint identification component not to collect the fingerprint data when gyroscope detects that the angular velocity of the mobile terminal is greater than a preset angular velocity.

20. A non-transitory computer readable storage medium having computer programs for exchanging digital data stored thereon, wherein the computer programs are configured to cause a computer to perform the optical fingerprint verification method, wherein the method is applied to a mobile terminal comprising an application processor (AP), an optical sensor, and an optical fingerprint identification component, and the method comprises:
  controlling, by the mobile terminal, the optical sensor to detect an external ambient light intensity when the mobile terminal acquires a fingerprint collecting instruction;
  controlling, by the mobile terminal, the optical fingerprint identification component to collect fingerprint data;
  determining, by the AP of the mobile terminal, whether the fingerprint data matches to a set of target fingerprint template data corresponding to the external ambient light intensity, and when the fingerprint data matches to the set of target fingerprint template data, determining by the mobile terminal that a fingerprint verification is passed.

* * * * *